June 28, 1932. G. B. COUBROUGH 1,864,583
METHOD OF PURIFYING OIL VAPORS
Filed June 28, 1927
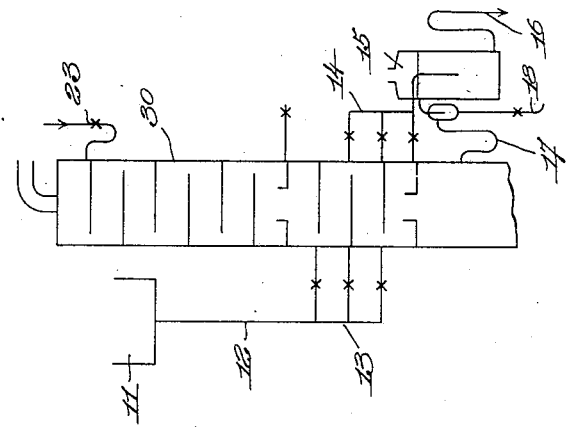
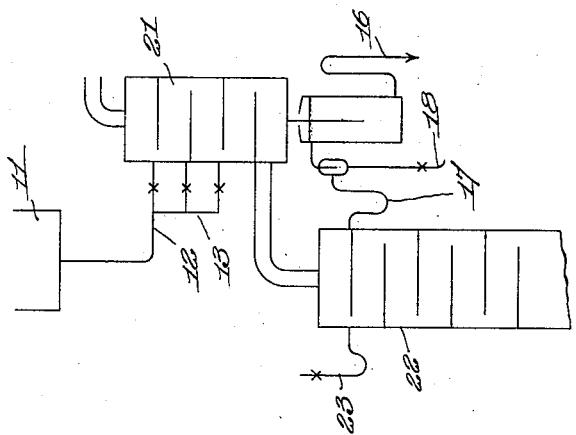
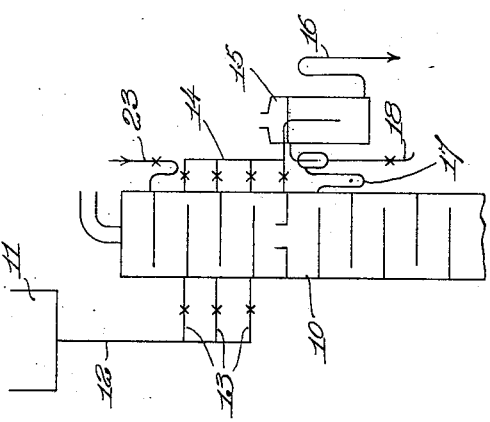

Patented June 28, 1932

1,864,583

UNITED STATES PATENT OFFICE

GEORGE B. COUBROUGH, OF LONG BEACH, CALIFORNIA, ASSIGNOR, BY MESNE ASSIGNMENTS, TO THE LUMMUS COMPANY, A CORPORATION OF DELAWARE

METHOD OF PURIFYING OIL VAPORS

Application filed June 28, 1927. Serial No. 202,121.

The present invention relates to an improved method of purifying oil vapors.

The lighter distillates from crude petroleum and also those obtained by cracking heavy petroleum oils, usually require to be purified by a special treatment to remove resinous or tarry impurities, objectionable color and offensive odors. This treatment is often difficult and sometimes expensive.

I have discovered that the color and odor of such distillates and especially of gasolenes, kerosenes, or the like, can be greatly improved and sometimes sufficiently purified by washing them with water while still in the vapor condition. The process is cheap and easily performed and quite effective when conducted with due regard to the nature and quantity of the impurities and the character of the products to be purified.

When the product to be purified is a single distillate, such as gasolene, it is usually sufficient to pass water continuously over the plates of the rectifying column at a point above the zone where they are concentrated by rectification, but far enough below the top of the rectifying column to provide a sufficient length of contact of the vapors with the water; the foul water is trapped off from the column as soon as its work is performed and is not permitted to descend into the fractional rectifying zone nor to remain longer in contact with ascending hot vapors than necessary lest excessive quantities of steam shall be formed and some of the impurities be concentrated by re-evaporation at higher temperatures.

In the accompanying drawing, Fig. 1 illustrates diagrammatically one form of apparatus for use in practising the method of the present invention. Figs. 2 and 3 similarly illustrate two other forms of apparatus for the same purpose.

I illustrate in Fig. 1 a rectifying column 10 with water supply 11, from which water is admitted to the column by a pipe 12 having multiple connections 13 to the upper trays or plates of a rectifying column 10 and connections 14 for withdrawing foul water to a settler or decanter 15 from which the oils, after separation from the foul water, (discharged by the pipe 16) may return to the column through the pipe 17 or may be collected separately through the pipe 18.

I illustrate in Fig. 2 a similar column divided into two sections, of which the upper section 21 is provided with a trap at the base to separate condensed oils from the discharged liquid mixture. By this arrangement as much of the vapor as may be desired may be allowed to condense according to the amount of water used and may be trapped back to the main body 22 of the rectifying column or collected separately as a finished product. In the apparatus of both Figs. 1 and 2 the inlet pipe for the reflux control liquid is indicated at 23.

When, however, the impurities are of such nature or proportion as to require washing before separation or rectification is complete, or at a higher temperature, I prefer to wash the vapor mixtures with water before its final concentration by rectification, in which case I perform the washing by admitting water at a lower stage of the column 30 where the temperature is higher as shown in Fig. 3. This method is especially desirable when two or more purified products are to be separated consecutively from a common vapor mixture, in which case it is usually possible to purify the products collectively by washing the vapors in a portion of the rectifying apparatus where they can be washed as a vapor mixture together. With this object, I admit the water below the zone of final separation but at a point sufficiently high in the column to avoid unfavorably high temperatures which might tend to evaporate the water excessively or to vaporize or entrain undesired components.

I illustrate this operation in Fig. 3, in which the similarly designed parts performing similar functions are identified by the same reference characters as in Fig. 1. In any case, it will be evident that the contact of water and vapors should not be unduly prolonged nor the quantity of water excessive except where a final distillate vapor is to be condensed simultaneously with the washing as in Fig. 2. It will be evident that the quantity of water required and the most favorable point for its application will vary with different quantities and degrees of impurity or discoloration, and must be ascertained by trial for any given material and products.

It will also be evident that in some cases the heat of the vapors may produce excessive evaporation of water to the detriment of rectification, especially when the washing is applied to a group of vapors having a temperature substantially higher than that of the end product. Such excessive evaporation of the water can be diminished by adding salts thereto to raise the boiling point of the water. For this purpose sodium chloride or calcium chloride may be used. Reagents for neutralizing corrosive impurities may be added to the water. For this purpose lime, soda or other suitable neutralizing agents may be added to or dissolved in the water or a separate solution may be used. The salts or reagents used in preparing the aqueous compounds are not to be employed in such proportions as to diminish unreasonably the purifying effect of the water.

What I claim is:

1. The method of purifying light petroleum distillates which consists in passing the distillate vapors through a rectifying zone, passing the rectified vapors through a washing zone, introducing water into the washing zone in countercurrent to the vapors and in quantity insufficient to condense more than a small quantity of vapor, withdrawing the water and condensate to prevent passage of the water into the rectifying zone, and permitting the purified distillate to pass off from the washing zone as vapor.

2. The method of purifying light petroleum distillates which consists in passing the distillate vapors through a rectifying zone, passing the rectified vapors through a washing zone, introducing water into the washing zone in countercurrent to the vapors and in quantity only sufficient to remove impurities while condensing only a small portion of the vapors, permitting the purified distillate to pass out of the washing zone uncondensed, withdrawing the water and condensed materials at a point to prevent passage of the water into the rectifying zone, decanting the condensed oils from the water, and introducing them into the rectifying zone as reflux.

3. The method of purifying light petroleum distillates which consists in passing the distillate vapors through a rectifying zone in countercurrent with reflux liquid introduced at the top of the rectifying zone, passing the vapors through a washing zone in countercurrent contact with water in quantity insufficient to condense more than a part of the vapor, permitting the remaining purified distillate to pass out of the washing zone as vapor, withdrawing all of the water and condensates from the washing zone to prevent passage of the water and the impurities into the rectifying zone, decanting the oils from the water, and introducing them into the rectifying zone as reflux.

4. The method of purifying light petroleum distillates which consists in passing distillate vapors successively through a rectifying zone and a washing zone, introducing reflux into the washing zone, introducing a small quantity of water into the washing zone insufficient to effect total condensation of the vapors, withdrawing water and condensates from the washing zone to prevent passage of the water into the rectifying zone, decanting the oil, and introducing the oil to pass through the rectifying zone as reflux.

In testimony whereof I have signed my name to this specification.

GEORGE B. COUBROUGH.